United States Patent [19]

Norton et al.

[11] 4,425,815
[45] Jan. 17, 1984

[54] WORMWHEELS

[75] Inventors: Colin F. Norton, Andover; Raymond G. Harvey, Newbury, both of England

[73] Assignee: Mastergear Company Limited, Newbury, United Kingdom

[21] Appl. No.: 196,022

[22] Filed: Oct. 10, 1980

[30] Foreign Application Priority Data

Aug. 29, 1980 [GB] United Kingdom ............... 8028068

[51] Int. Cl.$^3$ ..................... G01H 1/00; G01H 9/10
[52] U.S. Cl. .................................. 74/425; 74/437; 74/458; 29/159.2
[58] Field of Search ............... 474/902; 74/434, 439, 74/458, 438, 437, 425, 425.5; 29/159.2; 411/122; 308/62

[56] References Cited

U.S. PATENT DOCUMENTS

| | | | |
|---|---|---|---|
| 2,812,668 | 11/1957 | Holt | 74/458 |
| 3,561,579 | 1/1971 | Lenel | 74/434 |
| 3,602,058 | 8/1971 | Beddoe | 74/434 |
| 3,626,779 | 12/1971 | Howard | 74/439 |
| 3,768,327 | 10/1973 | Dunn et al. | 74/434 |
| 3,772,935 | 11/1973 | Dunn et al. | 74/434 |
| 3,866,486 | 2/1975 | Lechner | 74/458 |
| 4,056,014 | 11/1977 | Kraft | 474/902 |
| 4,059,023 | 11/1977 | Sproul | 474/902 |
| 4,226,136 | 10/1980 | Porter et al. | 74/458 |

FOREIGN PATENT DOCUMENTS 1180532 2/1970 United Kingdom .

Primary Examiner—John E. Murtagh
Assistant Examiner—Andrew Joseph Rudy
Attorney, Agent, or Firm—Scrivener, Clarke, Scrivener and Johnson

[57] ABSTRACT

A wormwheel (1) has teeth (2) over at least a portion of its periphery. The teeth (2) are shaped such that the pitch diameter (5) is greater at one face (3) of the wormwheel than the other and does not increase along the path of the tooth from said one face (3) to the other face (4). Because of this tooth shaping the wormwheel may be cast and is thus suitable for mass production. Wormwheels of this type are particularly, but not exclusively, suitable for use in valve actuators. In order to facilitate the casting process the wormwheel is formed with only one integral bearing (10) and has an internally splined opening (8) in which can be received a bearing sleeve (18) which may also be adapted to receive the valve stem within its own axial opening (21). A variety of bearing sleeves suitable for use with different valve stems may be provided for cooperation with the same wormwheel thereby eliminating the need for special adaptors and reducing the number of parts required to construct a range of valve actuators.

7 Claims, 5 Drawing Figures

WORMWHEELS

The present invention relates to improvements in or relating to wormwheels. The wormwheels of the present invention are particularly, but not exclusively, suitable for use in valve actuators.

The wormwheel to be described has a particular tooth formation which allows it to be cast rather than formed by conventional machining techniques thus permitting mass production.

The present invention, the scope of which is defined in the appended claims, includes a wormwheel having teeth disposed about at least a portion of its periphery, the pitch diameter of the teeth being greater adjacent one transverse face of the wheel than at the other face of the wheel and the pitch diameter never increasing along the path of a tooth from said one face to the other face.

The invention also includes a method of cutting a wormwheel comprising the steps of using a hob to form helical throated wormwheel teeth about at least a portion of the periphery and thereafter moving the hob axially of the wormwheel towards a face of the wormwheel to form tooth portions adjacent that face of substantially constant pitch diameter.

In order that the invention may be well understood an embodiment thereof will now be described, by way of example only, with reference to the accompanying drawings in which.

Figure 1:
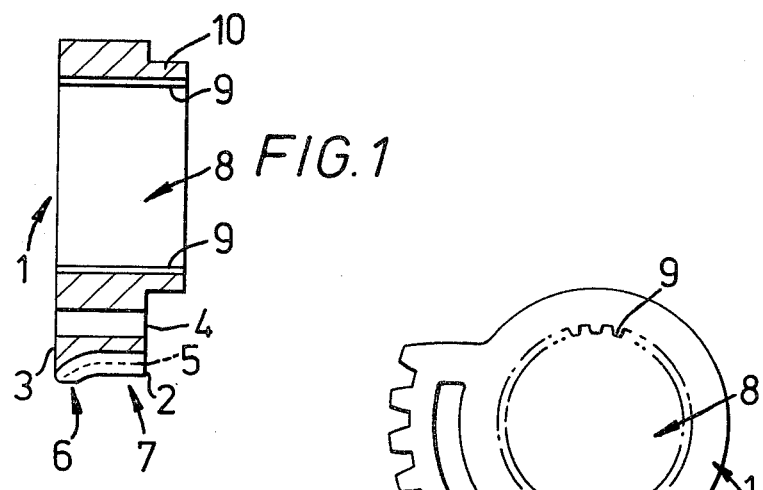
FIG. 1 is a longitudinal section of a wormwheel suitable for use in a valve actuator.
Figure 2:
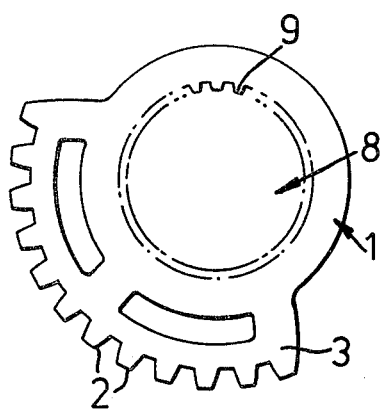
FIG. 2 is a plan view of the wormwheel of FIG. 1.

A wormwheel 1 has teeth over at least a portion of its periphery. As the wormwheel illustrated is for use in a valve actuator for a butterfly valve in which it is only necessary for the valve stem to be rotated through a quarter-turn between the open and closed positions, the teeth are only provided over just over a quarter of the periphery as seen in FIG. 2. The teeth 2 extend from one transverse face 3 of the wheel to the other face 4. The pitch diameter illustrated by the dotted line 5 in FIG. 1 is greatest adjacent the face 3 and never increases along the path of the tooth to the other face. As illustrated each tooth is divided into two transversely divided portions of roughly equal axial length. In the first portion 6 the tooth has a partial throat in which the pitch diameter decreases arcuately away from the face 3. This portion of the tooth is similar to half a conventional wormwheel tooth having a throat of a radius to match that of the pitch circle of the worm to ensure line contact between worm and wheel in use. Conventionally a wormwheel tooth is helical and has a helical angle equal to the lead angle of the worm. Likewise the portion 6 may have a helical angle which is preferably a shallow angle of say 5° or less to permit easy removal of a cast wormwheel from its tooling.

The portion 7 of the tooth is straight like a spur gear and has no variation in its pitch diameter along its axial length and no helical angle. There is a transition portion between portions 6 and 7 in which they merge smoothly together without discontinuity.

It is possible to dispense with the portion 7 but in applications such as for valve actuators where the torque required is high, up to, for example, 3,500 lbs. ins. (396 NM) it is preferable to provide the straight portion 7 for greater strength. Further the worm is preferably made of a harder material than the wormwheel so that during use the straight portion 7 wears into a throat so that the amount of contact between the worm and wormwheel gradually increases as wear takes place. For example, the wormwheel may be formed from sintered iron whilst the worm is made of carbon steel.

The wheel 1 has an axial opening 8 provided with internal splines 9. On face 4 a bearing 10 is formed for supporting the wormwheel 1.

Figure 3:
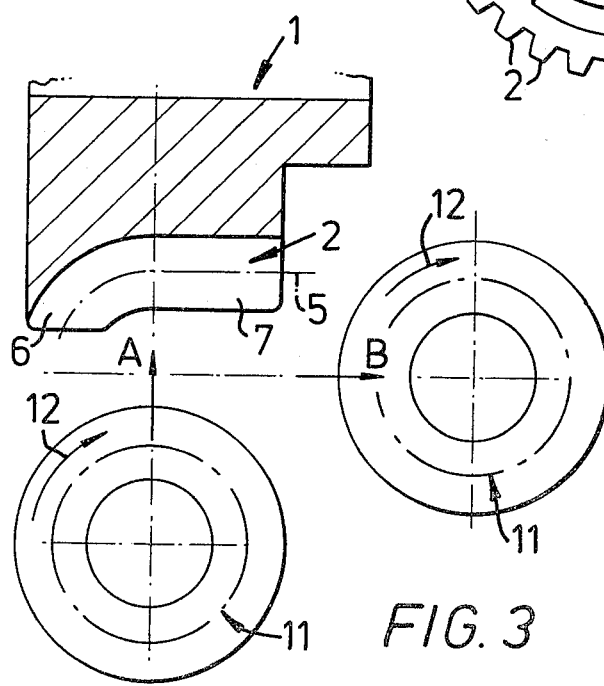
FIG. 3 shows a diagrammatic illustration of a method of cutting a wormwheel.

A method of cutting a master wormwheel from which a mould or die can be made for casting copies of the wormwheel is illustrated in FIG. 3. The technique of hobbing is used. A hob 11 corresponding to the worm to be used with the wheel rotates in the direction of arrow 12 in mesh with the gradually forming teeth 2 of the wormwheel which is likewise rotating about its axis. The hob gradually moves along the direction of arrow A until the teeth 2 are cut to their full depth. At this stage the teeth 2 have a full throat the pitch diameter increasing either side of the axis of approach A. In order to produce the straight portions 7 of the teeth 2 the hob is then moved axially of the wormwheel 2 in the direction of arrow B whilst the relative rotation of hob and wormwheel is maintained. It will be appreciated that a tapered hob which initially approaches the wormwheel blank tangentially may also be used to form the master wormwheel. The final step being completed by the same axial movement of the hob and wormwheel.

Once a master wormwheel has been formed to the required tolerance it can be used to form a re-usable die or mould by any known technique, for example spark erosion. The mould so formed is then used in a casting process to form wormwheels which can be readily and automatically ejected from the tooling without or with only a minimum amount of relative twisting, since the helical part of the tooth is also the curved portion 6 which is preferably ejected first from the tooling. Once cast the wormwheels may be provided, if desired, with surface coatings or finishes.

Figure 4:
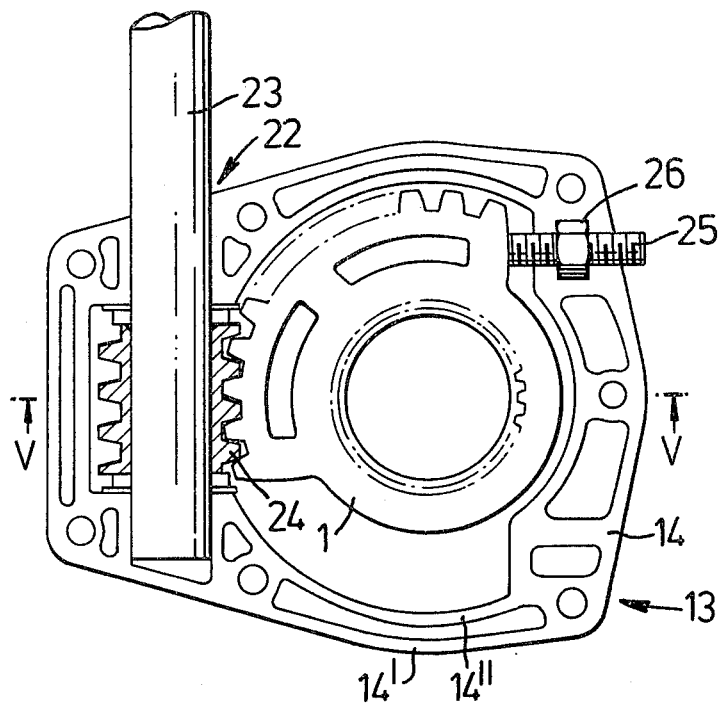
FIG. 4 shows a plan view of a casing half of a valve actuator containing a worm and wormwheel assembly.
Figure 5:
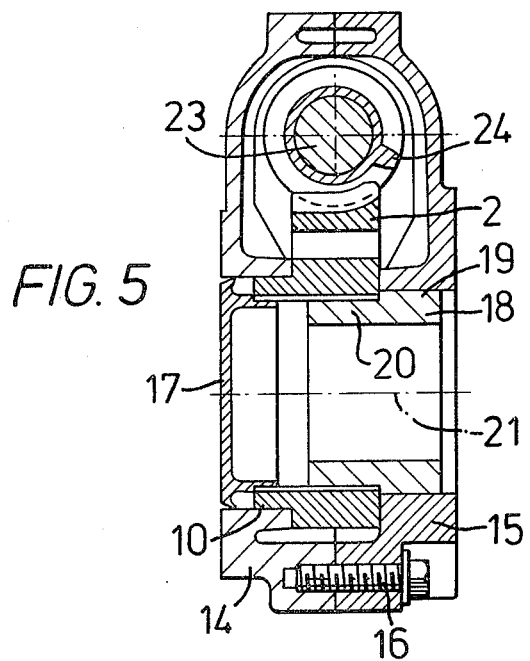
FIG. 5 is a section on the line V—V of FIG. 4.

FIGS. 4 and 5 illustrate an application of wormwheels produced as described above. A valve actuator 13 comprises a housing 13 having an upper casing section 14, and a lower casing section 15 secured together by fastening means such as the bolt 16. The housing may be cast in aluminium and preferably has multiple wall sections. Here double walls are shown with sections such as 14' and 14". The provision of multiple walling gives increased strength to the casing on account of the number of exposed wall surfaces produced in the casting process. The wormwheel 1 is located in the housing with its integral bearing 10 positioned in an opening in casing section 14. The opening in the casing 14 is sealed with a cap 17 which seals into opening 8 and cooperates with the splines 9. A bearing sleeve 18 has a portion 19 adapted to form a second bearing for the wormwheel 1. The second bearing is mounted in an opening in casing section 15. The bearing sleeve 18 also has an externally splined portion which is received in opening 8. The splines of portion 20 cooperate with splines 9 to prevent relative rotation of the sleeve 18 and the wormwheel. The sleeve 18 has a central axial opening 21 sized to receive the valve stem of the valve to be associated with the actuator. The interior of opening 21 may be provided with lugs or keyways or other means by which the valve stem may be mounted thereto. As the same size of actuator may be used with a variety of valves, it is possible to provide a range of bearing sleeves 18 all capable of fitting into the opening 8 of wormwheel 1 but having differently sized openings 21 to accept the different valve stems. Thus the bearing sleeve serves the dual purpose of providing the second bearing for the wormwheel and acting as an adaptor to the valve stem thus reducing the number of parts necessary to assemble a range of actuators for various different valves.

The housing 13 also accommodates the worm 22 having a shaft 23 which extends outside the housing and may be provided with a suitable handle (not shown) for manually rotating it. A worm thread 24 is turned on the shaft 23 and engages with teeth 2 of wormwheel 1 such that rotation of the shaft about its axis causes rotation of the wormwheel 1 about its axis and thereby rotation of a valve stem (not shown) fitted in opening 21 in the bearing sleeve 18. The valve stem is connected to a butterfly valve vane which it is only necessary to rotate through 90° between its open and closed positions. The actuator is shown in a position wherein the valve would be in a closed position. A shoulder of the wormwheel abuts against a stop bolt 25 fixed in the housing. The stop bolt may be rotated to move it axially so as to make fine adjustments of the stop position of the wormwheel and thus the exact position of the butterfly vane in its valve seating in the closed position. The stop bolt is mounted between the two casing sections and passes through a nut 26 accommodated in cooperating recesses in the two sections 14 and 15. Thus it is not necessary for the bore in the aluminium casing in which the bolt is received to be threaded.

We claim:

1. A worm and wormwheel, the wormwheel being of moulded sintered metal and having teeth disposed about at least a portion of its periphery, the pitch diameter of the teeth being greater adjacent one transverse face of the wheel than at the other face of the wheel, the pitch diameter of each tooth never increasing along the path of the tooth from said one face to the other face and each tooth having a straight portion with no helical angle, and the worm being of a harder material than the wormwheel so that in use the straight portions of the teeth of the wormwheel will wear to increase the contact between the teeth of the worm and wormwheel.

2. A worm and wormwheel as claimed in claim 1, wherein the pitch diameter of the teeth of the wormwheel decrease arcuately over a portion of each tooth lying adjacent said one face.

3. A worm and wormwheel as claimed in claim 1, wherein said straight portion of each tooth of the wormwheel has a constant pitch diameter.

4. A worm and wormwheel as claimed in claim 1, wherein each tooth of the wormwheel is formed with a helical angle over a portion of each tooth lying adjacent said one face.

5. A worm and wormwheel as claimed in claim 1, the wormwheel having an axial internally splined opening, and a bearing formed about said opening on only one face of the wormwheel.

6. A worm and wormwheel as claimed in claim 5, and a bearing sleeve having an externally splined portion adapted to be received within said opening, the bearing sleeve also having a portion adapted to form a second bearing on the face of the wormwheel not provided therewith.

7. A valve actuator comprising a combination as claimed in claim 6, wherein the bearing sleeve is provided with an axial opening adapted to receive therewithin a valve stem.

* * * * *